United States Patent [19]

Peterson

[11] Patent Number: 4,682,512
[45] Date of Patent: Jul. 28, 1987

[54] POWER TRAIN FOR HEAVY LIFT HELICOPTERS

[76] Inventor: Carlton G. Peterson, P.O. Box 27345, Tempe, Ariz. 85282

[21] Appl. No.: 781,336

[22] Filed: Sep. 30, 1985

[51] Int. Cl.[4] .................. F16H 57/00; F16H 37/06
[52] U.S. Cl. ............................ 74/410; 416/170 R; 74/665 C
[58] Field of Search ............ 74/665 A, 665 B, 665 C, 74/665 D, 665 E, 410, 411; 416/170 B

[56] References Cited

U.S. PATENT DOCUMENTS

| | | | |
|---|---|---|---|
| 3,206,993 | 9/1965 | Niemann | 74/410 |
| 3,434,365 | 3/1969 | Quenneville | 74/410 |
| 3,456,518 | 7/1969 | Topouzian | 74/410 X |
| 3,678,775 | 7/1972 | Danielsson | 74/410 |
| 3,977,632 | 8/1976 | Watson | 416/170 R X |
| 4,479,619 | 10/1984 | Saunders et al. | 416/170 R X |
| 4,489,625 | 12/1984 | White | 74/665 C |

*Primary Examiner*—Allan D. Herrmann
*Assistant Examiner*—Dirk Wright
*Attorney, Agent, or Firm*—Roger A. Marrs

[57] ABSTRACT

A highly efficient ultra-light weight heavy lift helicopter transmission is disclosed herein which, by these very characteristics, allows greater helicopter payloads and gross weights than now can be attained using present state of the art design approaches. These characteristics are made possible through the use of:

1. Multiple vertically mounted engines which allow short power paths and a minimum number of gear meshes in series.
2. Many load sharing power paths (three per engine) having fixed load sharing ratios which are unaffected by transmission deflections and manufacturing tolerances.
3. A large overall gear reduction through the use of differential planetary meshes (one per engine) and a large gear reduction with many input load paths at its final output herringbone type gear stage.
4. A unique final stage, bearingless, floating bull gear support system having an ultra lightweight reaction load path means, and
5. An isolation mounting means for the transmission whereby the structural demand of the transmission is only torsional.

27 Claims, 14 Drawing Figures

POWER TRAIN FOR HEAVY LIFT HELICOPTERS

BACKGROUND OF THE INVENTION

1. Field of the Invention

The present invention relates to the field of power transmission systems for helicopters and other devices and, more particularly, to a novel large gear reduction power transmission including an extremely lightweight, simple and efficient transmission having a minimum number of gear meshes in series, which, when used in conjuction with heavy lift helicopters, can extend the gross lifting weight and payload of this type of aircraft for beyond that which is now possible.

2. Definition of Problem

Figure 3:
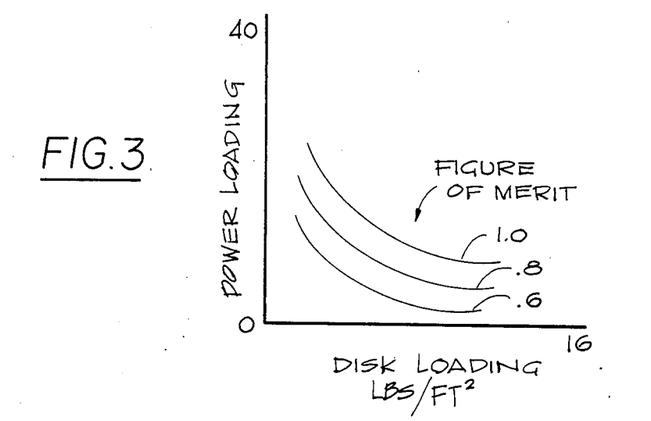
FIG. 3 is a graph showing power loading (pound per horse power) versus disk loading (pounds per square foot of the rotor disk area) using different figures of merit for present state of the art helicopters.

In the design and construction of any airborne vehicle, weight reduction is always of critical concern and is directly related to the payload available for transport in the vehicle. In such vehicles as heavy lift helicopters, the transmission operably connected between the engine and the lifting rotor presents an additional weight problem. Helicopter transmission weight increases along an exponential curve as the rotor diameter is increased because rotor tip speed, disk loading and power loading are not functions of helicopter gross weight and size. Rotor tip speed is usually about 700 feet per second and disk loading (gross weight per square foot of rotor area) and power loading (gross weight per horse power) usually fall within the curves shown in FIG. 3.

The result of the above facts is that gross weight and power go up by the square of the rotor diameter and torque goes up by the cube because RPM (for the same rotor tip speed) is inversely proportional to RPM. Transmission weight obviously goes up with an increase in torque and overall gear ratio.

In conventional size helicopters this phenomenon does not make too significant an impact, but as gross weight increases in heavy lift helicopters, this exponential relationship between transmission weight and gross weight can be extrapolated to the point where payload is completely taken over by transmission weight. Obviously, the cost effective size of a helicopter falls far below this point.

Figure 4:
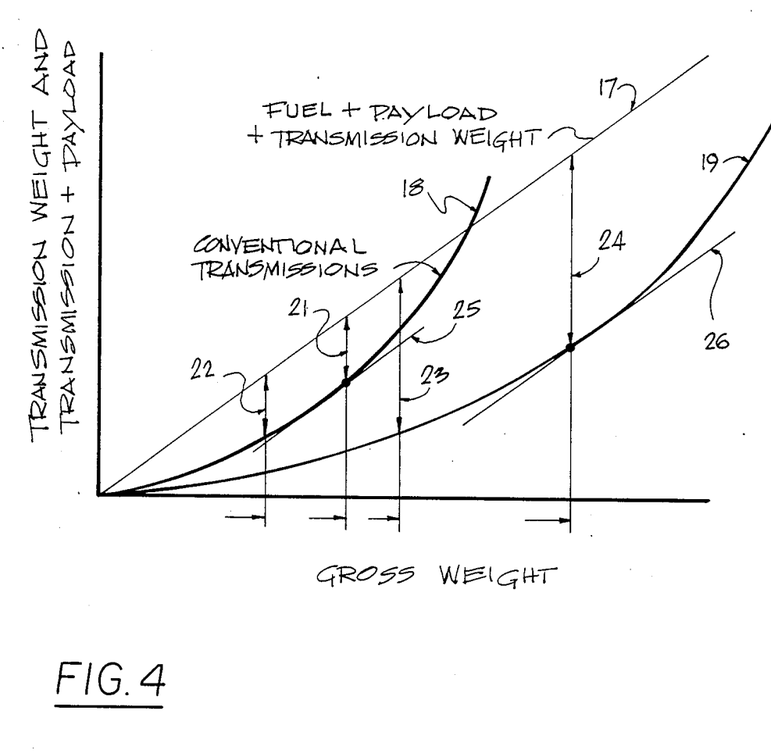
FIG. 4 is a graph showing the relationship of helicopter payload and transmission weight as transmission weight grows exponentially with gross weight growth.

FIG. 4 graphically depicts the phenomenon discussed above. If line 17 represents the sum total of payload, fuel and transmission weight, and line 18 represents the weight of a conventional helicopter transmission, and line 19 represents the weight of the transmission using the present invention, it can be seen that the vector length (shown between the arrowheads) of lines 21, 22, 23 and 24 represent payload and fuel at the gross weights shown for both vehicles. With a conventional transmission, the maximum possible payload is line 21 where its intersection with line 18 is at the tangent point of 18 and 25 which is parallel to line 17. When gross weight reaches the intersection of lines 17 and 18, the payload and fuel is entirely used up by transmission weight. The practical gross weight is at a point way down the curve on line 22 which is dictated by cost effectiveness and actual payload requirements.

Line 19 has the same general shape as line 18 but it falls much further out on the gross weight curve which in turn produces a much greater payload. It can be seen that line 24 represents the maximum payload possible and line 23 represents a cost effective payload comparable to payload 22 using the conventional transmission. The difference in these payloads is substantial.

3. Approach to Problem Solution

The weight of a gear mesh in any transmission is a function not only of tooth load but also of the number of teeth which are loaded at any one instant of time in relation to the total number of teeth in the mesh. As tooth load is indirectly proportional to the number of input pinions in a divided load path gear mesh, and as the percentage of loaded teeth to total teeth goes up with an increase of input pinions, it is therefore obvious that weight can be decreased substantially by splitting the power in several parallel paths by increasing the number of input pinions driving a common putput gear and by increasing the overall transmission efficiency by reducing the number of gear stages in series by having a large gear reduction at the final stage.

4. Brief Description of Prior Art

Existing helicopters usually use planetary type gear meshes in their rotor transmissions, especially in the final stage where weight is the highest due to low RPM and high torque requirements. Planetary gears can transmit more power for less weight than a conventional pinion and gear because it divides the torque into several planetary gears thus allowing lower tooth loading of each gear mesh.

Unfortunately, due to the geometric constraints of a planetary gear mesh, the number of planetary gears used to divide the tooth loads is limited by the gear ratio of the mesh. If a large overall gear ratio is required, more meshes are needed in series to provide the total. For example, a four to one gear ratio in a simple planetary mesh cannot have more than five planetary gears. It is therefore impossible to obtain a high gear ratio with a standard planetary mesh and have a high number of planetary gears at the same time.

Much of the fundamental reason for splitting the torque in planetary meshes is lost when two or more planetary meshes are combined in series. A single input of one mesh produces a single output which becomes the single input of the next stage. Multi engined helicopters which start with as many load paths as they have engines must combine their separate power from each engine into a single input gear of the planetary mesh from adjoining gear boxes requiring support bearings and heavy structure to maintain rigidity between the pitch diameters of the mating teeth.

Load factors placed on planetary meshes also add weight. Although the sun gear of a planetary mesh usually floats at the center of the planet carrier gear cluster, when more than three planet carrier gears are used, a load factor must be added to all the gears in the mesh to allow for uneven load distribution due to deflections and manufacturing tolerances.

Using a planetary mesh as the final stage of a transmission is therefore not the lightest method of converting power from high RPM at low torque to low RPM at high torque.

A long standing need has existed to provide a lighter and more efficient heavy lift helicopter transmission.

State of the art improvements in metallurgy, detail design techniques, etc. have reduced transmission weight fractions somewhat. These improvements, however, are on the "flat part of the curve". Future weight savings will be small in these areas.

In order to substantially extend the gross weight and payload of heavy lift helicopters, an entirely new design concept is required to make the quantum jump in transmission weight reduction in order to meet and satisfy the heavy payload requirements of the trade.

SUMMARY OF THE INVENTION

Accordingly, the above problems and difficulties are obviated by the present invention which provides a novel power train for a heavy lift helicopter incorporating an extremely lighweight power transmission operably connected between a plurality of input engines each splitting its power into three separate and independant load paths not connecting with the other engines until combining at the final stage gear mesh having many pinions driving a single final stage output ring gear with a high gear ratio between it and its driving pinions.

Each engine of the plurality employed in the invention is mounted vertically with its output shaft entering directly into a first and only differential planetary gear mesh for driving the final stage of output pinions to preclude the need of changing engine drive shaft directions.

One of the objectives of the present invention is to provide a gear train system for a helicopter transmission which is designed to preclude overloading gears from one power path while another power path is relieved of its load because of manufacturing tolerances and/or deflections. This feature greatly reduces weight because the gears and bearings do not have to be designed to carry an overload condition.

A further object of the present invention is to provide a novel helicopter transmission having the combination of both a high driving gear ratio at its final output stage and many pinion gear load inputs to a single output ring gear. The result of this combination is a substantial weight saving. The high gear ratio lowers the torque and number of gear meshes required "up stream", and the multiple pinion inputs lowers the gear tooth loads, increases the percentage of teeth under load at any one instant, and therefore lowers the ring gear weight.

Still another object of the present invention is to provide a novel transmission which further reduces weight by eliminating the need for bearings and structural support for the final stage ring gear by floating it on its mating pinion gears and more precisely on rollers whose diameters are equal to the pitch diameters of the mating gears which are located on each end of the gears and are attached to the gears to prevent the mating teeth from jamming in case of unequal tooth loading due to engine out, unequal engine torque input conditions, unequal deflections and manufacturing tolerances and/or lateral accelerations of the transmission.

Still another object of the present invention is to mount each of the final stage pinion gears on a single spherical ball or roller bearing at the center of each pinion. This feature fundamentally gives each pinion all six degrees of freedom (three rotational and three translational) while other design features constrain these degrees of freedom in an optimum weight saving relationship.

Another object of the present invention is to vertically secure only three of the final stage pinions in order that this in turn will support the final stage ring gear with a non-binding three point suspension system.

Still a further object of the present invention is to provide a primary power propulsion means for use with a lightweight transmission incorporating vertical engines in order to reduce the number of gear stages which will therefore reduce more weight and cost and, in turn, increase the total efficiency of the transmission which in itself shall also reduce overall helicopter weight.

Another object of the present invention is to provide a fairly high intermediate gear reduction by the use of the "differential" planetary principle, i.e., the gear reduction of both the planet carrier and the ring gear are greater than a simple planetary or "star" type planetary would be by itself.

Yet another object of the present invention is to provide a lightweight helicopter transmission which is isolated from the helicopter structure by a floating elastomeric mount carrying torque and torque reaction while minimizing the effects of outside structural deflections.

Another object of the present invention is to combine all the features of the invention described herein in such a manner that most of the need for structural rigidity required in present helicopter transmissions no longer exists which allows the subject transmission structure to be designed from a stress standpoint instead of from a rigidity standpoint. Thereby, reducing much structual weight.

Still another object of the present invention is to equally divide and transfer the torque of a rotating shaft to two parallel shafts while at the same time lowering the RPM and reversing the rotation of the two driven shafts.

BRIEF DESCRIPTION OF THE DRAWINGS

The features of the present invention which are believed to be novel are set forth with particularity in the appended claims. The present invention, both as to its orgainzation and manner of operation, together with further objects and advantages thereof, may best be understood by reference to the following description, taken in connection with the accompanying drawings in which:

DESCRIPTION OF THE PREFERRED EMBODIMENT

Figure 1:
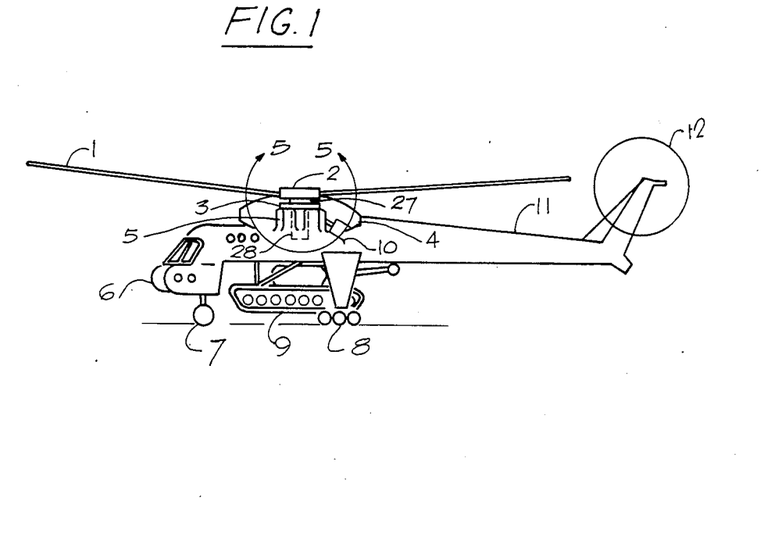
FIG. 1 is a side elevational view of a heavy lift helicopter incorporating the lightweight transmission of the present invention.

Referring to FIG. 1, the novel ultra lightweight transmission of the present invention is illustrated in the enclosure 5—5 and is shown in relation to the rotor blades 1, the rotor hub 2, the rotor shaft 27, the non-rotating mast 28, and the vertically mounted engines 5 of a heavy lift helicopter 6. Although six engines are shown in this configuration, more or less engines may be used to perform the same function without altering the concept of the invention.

This transmission accepts the high speed output shaft of each engine, splits the power into three load paths per engine, each of which apply its share of power to a common slow speed, high torque "bull" ring gear which is torsionally attached to the rotor hub shaft that drives the rotor hub and the blades to provide lift for the helicopter.

The split torque load sharing methods together with other conceptual design features by which power is transmitted from the engine to the final stage "bull" gear greatly reduces gear tooth loads and torsional load paths which in turn reduce transmission weight thereby increasing potential payload to allow very heavy cargo such as vehicle 9 shown in FIG. 1.

Figure 2:
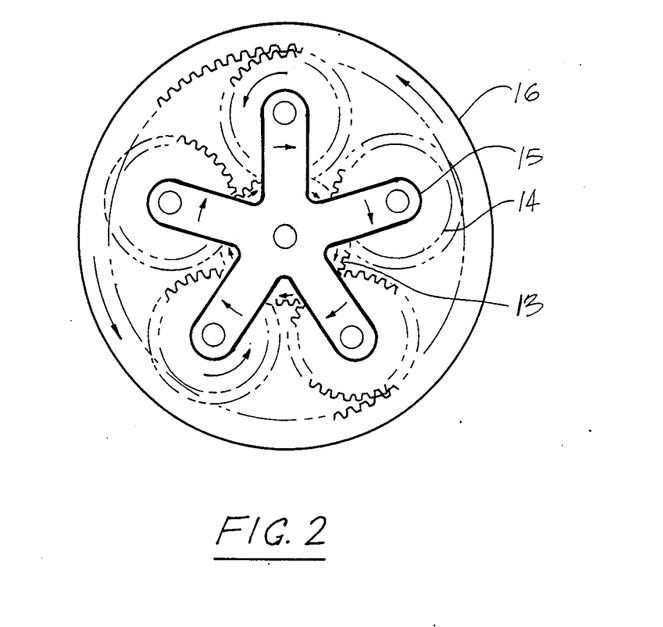
FIG. 2 shows the primary elements of a conventional or prior art planetary type gear reduction power transmission.

The planetary mesh of the present invention is a differential type planetary and is shown in FIG. 2, i.e., the ring gear is driven in one direction and the planet carrier is driven in the other direction. The planet carrier of this planetary mesh is connected through a quill shaft to a single herringbone type pinion gear which in turn drives its share of the engine's power to the herringbone "bull" gear. The ring gear of the differential planetray mesh, which turns in the opposite direction, drives a quill shaft connected to an intermediate floating pinion driving two gears mounted on parallel shafts at a reduced RPM and in the proper rotational direction, each of which drives a final stage pinion which provides its share of the engine power to the "bull" gear. The floating pinion provides equal and opposite tooth loads in a force couple, i.e., each load is the reaction to the other.

Figure 14:
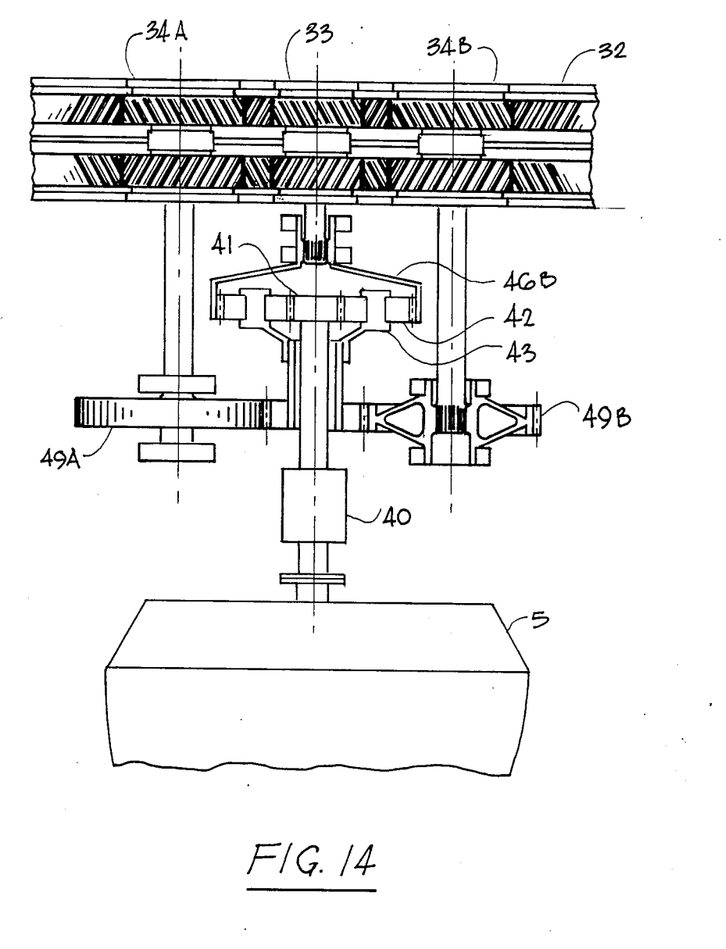
FIG. 14 is an alternate means of taking power from the differential planetary gear stage by which its planet carrier drives the load splitting intermediate floating pinion and its ring gear drives the final stage center pinion.

The fact that the pinion "floats" with no support bearing demands that the loads going to each of these gears are always equal and opposite thereby assuring true equal load sharing without random peak loading of gear teeth. Proportional load sharing between the final stage pinion driven by the planet carrier and the final stage pinions driven by the ring gear is attained by the differential feature of the planetary mesh. An alternate to the above drive train is to drive the single herringbone type pinion gear by the planetary ring gear and the two gears mounted on parallel shafts by the planet carrier (see FIG. 14).

Figure 5:
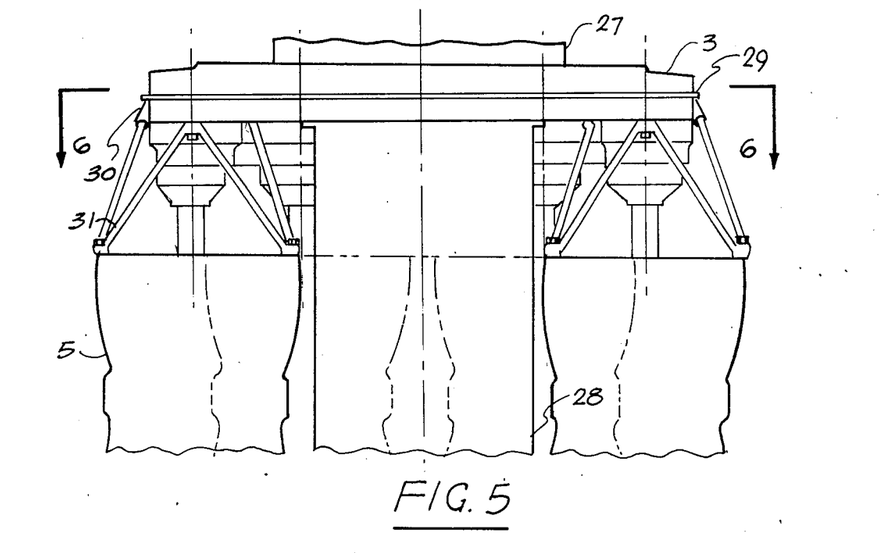
FIG. 5 is an enlarged side elevational taken along lines 5—5 of FIG. 1 showing the lightweight transmission of the present invention in relation to the engines, rotor hub shaft, and mast.

Referring now to FIG. 5 (which is an enlarged view of 5—5 of FIG. 1), it can be seen that the light-weight transmission 3 incorporating the present invention interfaces with a plurality of shaft driven engines 5 the non-rotating airframe structure which in this case shown is the non-rotating mast 28 and the rotating shaft of the hub 27. In more detail, the non-rotating structure of the transmission 29 is connected to mast 28, while the substructure 30 is connected to truss sturcture 31 which in turn are connected to the engines. Engine torque and power are transmitted from each engine's drive shaft through separate power paths per engine to a common "bull" gear 32 which interfaces with and supplies rotational power to the rotor blades via the hub shaft and the rotor hub.

Figure 6:
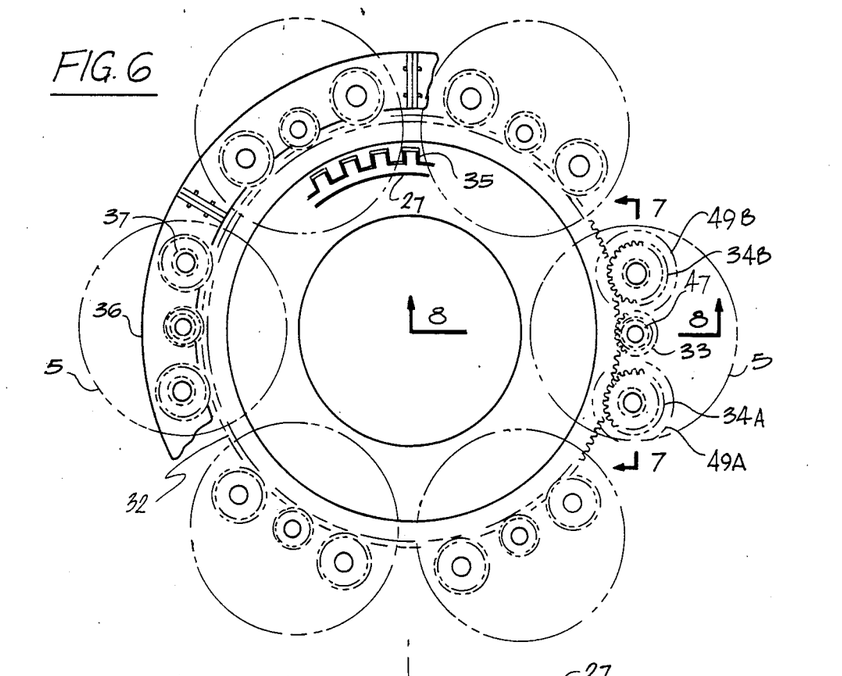
FIG. 6 is a transverse cross-sectional view 6—6 of FIG. 5 of the final stage ring gear and pinion gear mesh of the present invention showing the driven or "bull" ring gear and the 18 final stage driven pinions (three per engine), the circular sheer web holding these pinions, and the "soft" connection of the ring gear to the hub shaft.

FIG. 6 (section 6—6 of FIG. 5) is a schematic diagram of the final gear stage. A multiplicity of engines 5 each drive a set of three output pinions 33, 34A and 34B which in turn provide torque and rotation to the "bull" gear 32. Each of these pinions is mounted on a single spherical bearing 37 which in turn is mounted on a segment of a cylindrical sheer web 36. Each of these segments 36 are bolted together to form a circular ring which carries the torsional reactions of the tooth loads of the pinion gears. The pinion gear tooth loads driving the "bull" gear are torsionally transferred from the "bull" gear through elastomeric coupler 35 to hub shaft 27 which in turn drives the rotor hub and blades.

Because this final stage gear reduction allows the combination of two factors to simultaneously occur (multiple load input combined with a large ratio between pinion and "bull" gear) much weight can be saved over conventional planetary final stage systems. Tooth loads are inversely proportional to the number of load inputs and a large gear ratio lowers not only the torque requirements "up stream" but the number of gear stages "up stream" required to produce the overall transmission gear reduction.

Figure 7:
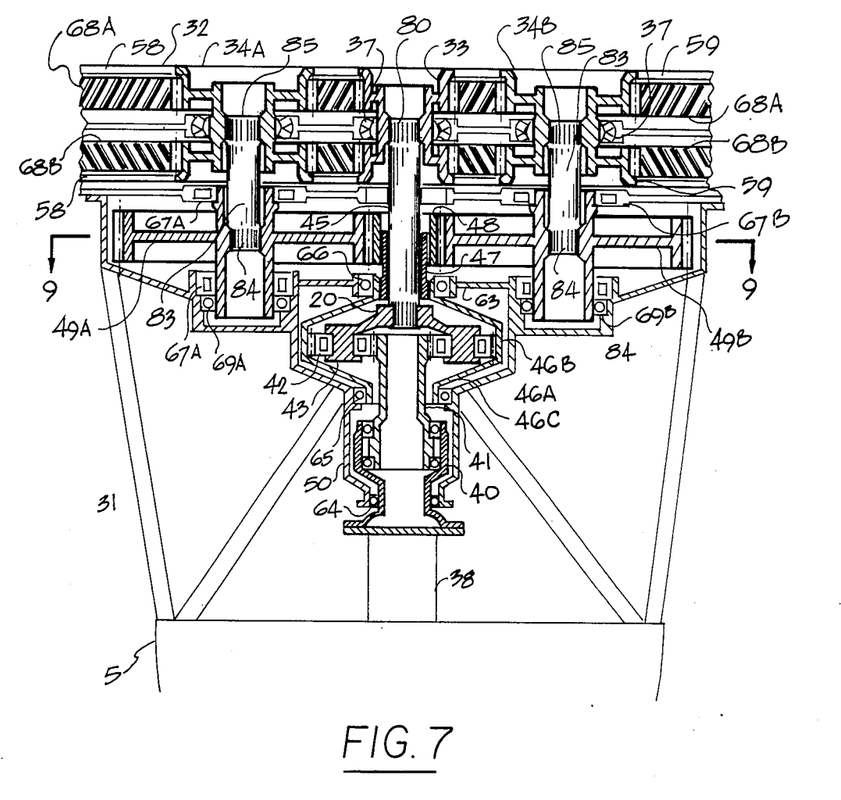
FIG. 7 is a longitudinal cross-sectional view taken along lines 7—7 of FIG. 6 showing the primary elements of the power transmission from one engine to the ring gear output element of the whole transmission.
Figure 8:
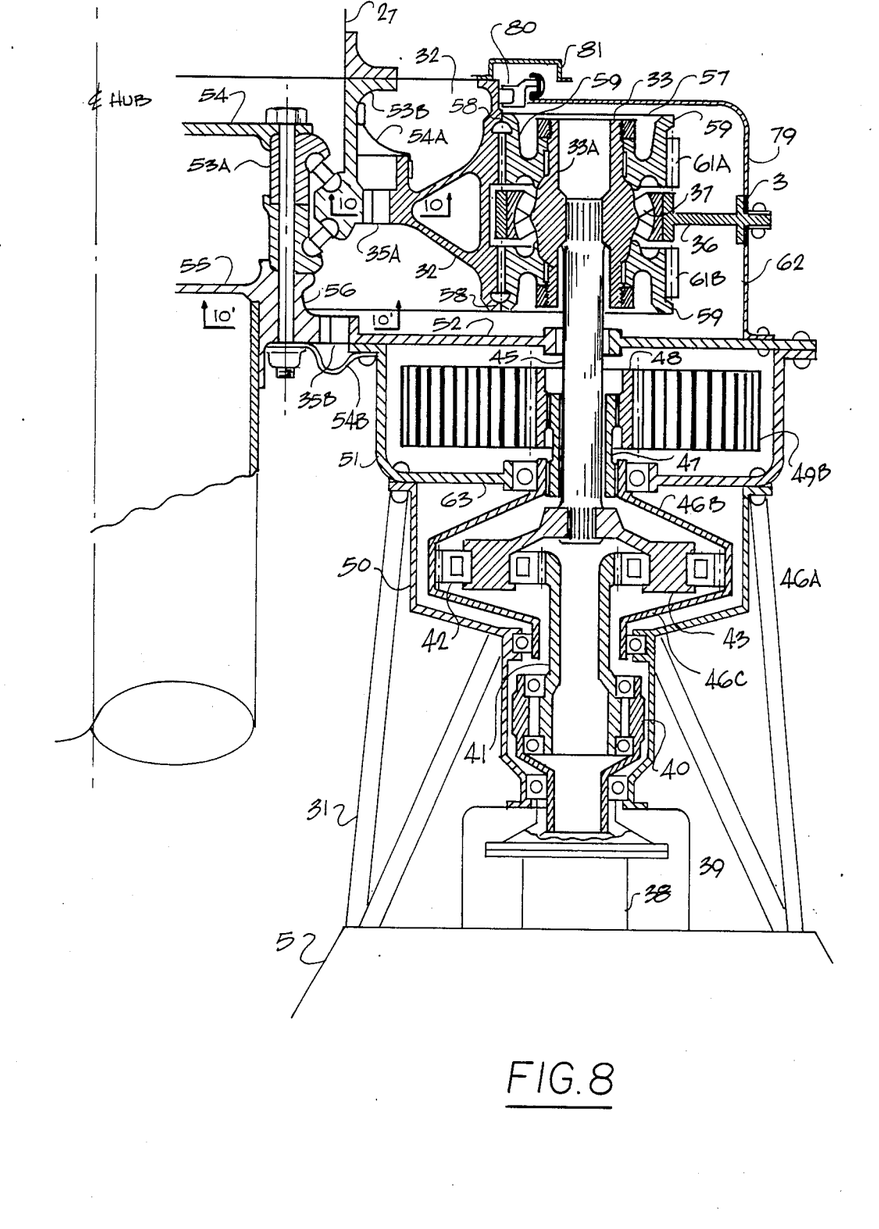
FIG. 8 is a longitudinal cross-sectional view taken along lines 8—8 of FIG. 6 showing the primary elements of the transmission from one engine on a plane through the mast center line and the center line of one engine and showing the transmission interface of this section with the mast, the rotor hub bearing support, and the transmission output bull gear.

Referring to FIGS. 7 and 8, one can see how the power from each engine is divided into the three separate load/power paths that drive the "bull" gear.

Engine drive shaft 38 is directly connected to an overrunning clutch which in turn drives the sun gear 41 of a differential type planetary gear mesh. It is noted that high speed shafts driving standard type planetary gear meshes are limited by centrifugal forces imposed upon the planet carrier gear bearings which are vectorially additive to their drive torque load. In the case of this invention, the planet carrier RPM is sufficiently low, because of the differential feature of the gear mesh, to cause the centrifugal forces applied to planet carrier gear bearing 42 to be insignificant.

Power is applied from sun gear 41 to planet carrier 43 in one direction and to ring gear 46A in the other direction. Ring gear 46A is attached to rotating cones 46B and 46C which in turn rotate about bearings 65 and 66 mounted to the transmission structure 50 and 63.

Planet carrier 43 is torsionally and coaxially connected to quill shaft 45 through crowned spline 20 which in turn is torsionally and coaxially connected to pinion gear 33 through crowned spline 80.

The function of the quill shaft and crowned splines in this path is to provide power between planet carrier 43 and pinion 33 by applying pure torque without the the side effects from manufacturing tolerances and deflections causing forces and stresses in other degrees of freedom.

Torque and rotation of ring gear 46A is transferred to cone 46B to quill shaft 47 to floating pinion 48.

Figure 9:
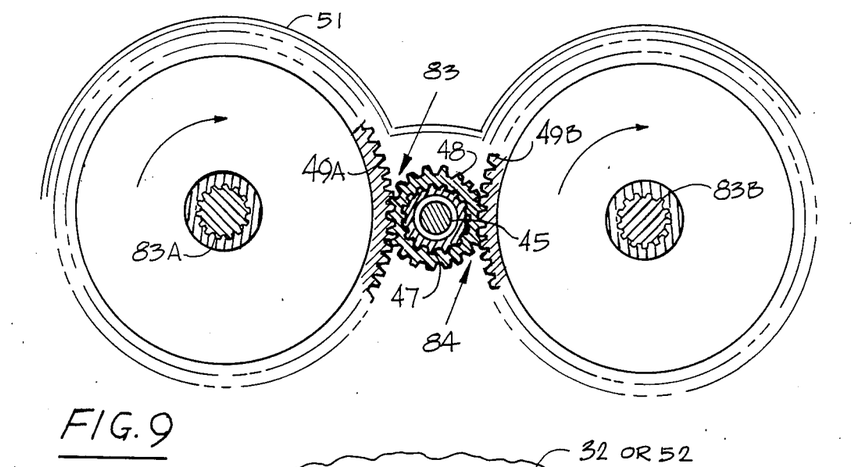
FIG. 9 is a transverse cross-sectional view taken along lines 9—9 of FIG. 7 showing the "floating" intermediate pinion which equally divides its torque between two lay shaft gears.

Turning to FIG. 9, it can be noted that because floating pinion 48 has no support bearings, the forces it creates in the direction of arrows loads 83 and 84 from the torque applied to it from quill shaft 47, must be an equal and opposite pure force couple which means that the torque and power will be equally shared by lay gears 49A and 49B. Any misalignments or differential acceleration between the two gears will be compensated for by a translation of pinion 45.

The nature of this crowned spline quill shaft 47 connector allows pinion gear 48 to float in space thereby sharing its torque equally between lay gears 49A and 49B.

Load sharing between final stage pinions 33 and 34A and 34B pinions will remain a constant because of the very nature of the differential planetary mesh.

Quill shafts 83 with crowned splines 84 and 85 provide power to pinions 34A and 34B from lay gears 49A and 49B in a similar way as that of quill shaft 45 transferring power from planet carrier 43 to pinion 33.

Bearings 67A and 67B support lay gears 49A and 49B and are mounted in structure 52 and 63 which maintains an accurate center to center distance between lay gears 49A and 49B. These two gears and floating pinion gear 48 in its neutral position all lie on the same plane which optimizes the floating feature of pinion 48. This requirement demans that the axis of rotation of pinion gears 33 and 34A and 34B also lie on the same plane which is the reason why pinion 33 is smaller than pinions 34A and 34B in order that they also mate with "bull" gear 32. Thrust bearings 69A and 69B hold lay gears 49A and 49B in their proper vertical position.

Maintaing alignment and pitch diameter tangency on the teeth of mating gears is absolutely essential.

Normally, this tooth alignment and pitch diameter requirement is obtained by maintaining gear shaft alignment and a constant center distance between the mating gears by making both the gears and the structural return load path to the supporting shafts of the gears both accurate and rigid in order to maintain these desired relationships even when extraneous outside forces are applied to the transmission.

In order to eliminate weight, a primary object of this present invention is to approach this tooth alignment and pitch diameter tangency requirement from an entirely different concept at the final mesh of the transmission. By not demanding heavy structure to maintain gear axis center distance and alignment, but rather by giving the driving pinion its six degrees of freedom so it can follow any discrepancies in the driven gear and then constraining the movement of the driver gear where necessary to obtain the desired relationship between the two mating gears, the heavy gear support structure can be eliminated.

Referring to FIG. 8, spherical bearing 37 is mounted on structural sheer web 36 and supports gear shaft 57 upon which helical gears 61A and 61B are mounted with a splined connection to shaft 33 A forming gear assembly 33. Gear teeth 61A and 61B are of opposite helix angles which makes gear assembly 33 a herringbone type.

The outer rims of all but three of spherical bearings 37 float axially on shear web 36 in order that gear assemblies 33, 34A and 34B can axially follow any axial deflection of bull gear 32. The three remaining spherical bearings 37 are axially secured on web 36 and thereby axially support bull gear 32 on a three point suspension system using the characteristics of the herringbone mesh to accomplish the task.

Rollers 58, which are an integral part of, which are at each end of, and whose diameters are equal to the pitch diameter of "bull" gear 32 come in contact with similar rollers 59 which are attached to and whose diameters are equal to the pitch diameters of gear 61A and 61B. Bearing 37 is positioned on sheer web 36 to preload rollers 59 agains rollers 58.

The final stage gear mesh of the present invention follows the above concept.

The results of this invention are as follows:

1. Spherical bearing 37 allows gear assemblies 33, 34A and 34B freedom to roll sideways and yaw while following any discrepancies of position and/or alignment of bull gear 32 teeth.

2. Rollers 58 and 59 prevent gear teeth 61A and 61B of gear assembly 33, 34A and 34B from jamming into teeth of bull gear 32.

3. The face width (wheelbase) of teeth 61A and 61B prevent gear assembly 33 from yawing except as desired in paragraph 1 above.

4. The wheelbase of roller 59 reacting against spherical bearing 37 and rollers 58 prevent pinion gear assembly 33 from rolling sideways.

5. The herringbone feature of gear teeth 61A and 61B prevents pinion gear assembly 33 from translating vertically except when the floating pinions 33 are driven vertically by axial translation deflections of bull gear 32.

6. The radial preload applied to rollers 59 and 58 by the hoop tension load of sheer web 36 will be reduced to almost zero by the applied tooth load resulting from torque input to pinion gear assemblies 33, 34A and 34B. This will lower the rolling friction of rollers 58 and 59 thereby increasing transmission efficiency.

The overall effect of this final stage gear reduction allows the bull gear to become light and flexible without causing tooth misalignment and mismatch of pitch diameter tangencies.

The torque reaction to the final stage tooth loads are reacted by pure sheer stresses in sheer web 26 which in turn is reacted by pure torsional sheer in cylindrical structure 62 and sheer web 52 before transferring through torsional elastomeric isolator 35B to rotor mast 28.

The output driving torque of bull gear 32 is transferred through torsional elastomeric isolator 35A to rotating member 53B of rotor support bearing before being transferred to rotor hub shaft 27 which in turn drives the rotor hub and main rotor blades of the helicopter.

Rubber seals 54A and 54B seal the transmission from the environment. Rotating seal 80 guarded by removable cover plate 81 is the only necessary rotary seal and is attached to thin wall cover plate 79.

Figure 10:
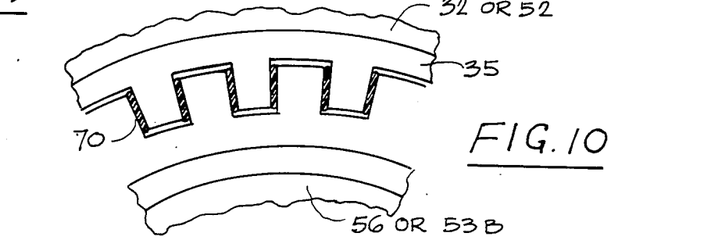
FIG. 10 is a fragmentary sectional view taken along lines 10—10 and lines 10-10' of FIG. 8 showing the deflection isolation between the bull gear and the rotating member of the rotor support bearing, and between the transmission structure and the non-rotating mast.

Torsional elastomer 35A and 35B can be identical and are shown in FIG. 10. Elastomer 20 allow bull gear 32 and/or transmission structure 52 to deflect under load with respect to support bearing rotating member 53B and non-rotating bearing adapter 56 while still transmitting torque and torque reaction respectively to 53B and 56.

Figure 11:
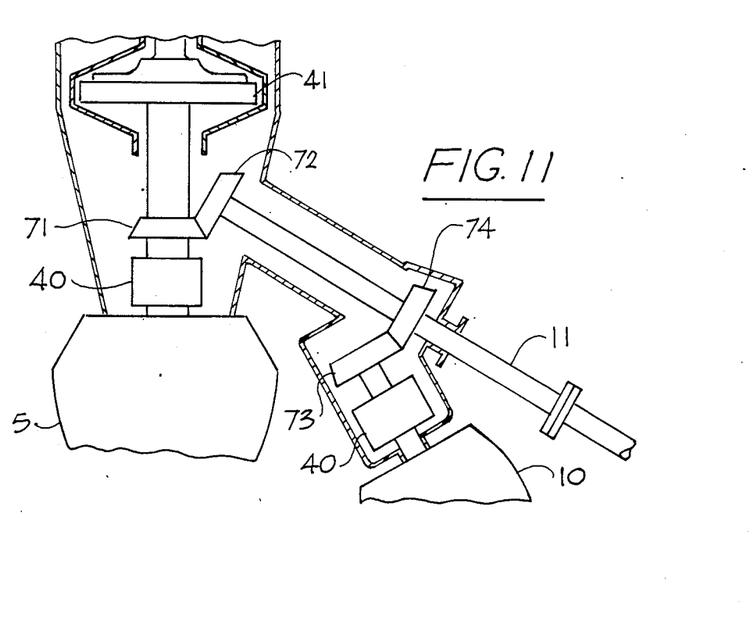
FIG. 11 is a cross-sectional view of the aircraft center line showing a means by which power is transmitted to the tail rotor from the rotor transmission.

FIG. 11 shows a method by which tail rotor power can be coordinated with the main rotor by connecting tail rotor shaft 11 to engine 5 by bevel gears 71 and 72, and engine 10 by bevel gears 73 and 74 RPM synchronization can be attained between main rotor 1 and tail rotor 12 without transferring power with all engines on. If engine 10 fails, engine 5 will absorb the power at the expense of its contribution to the main rotor.

Figure 12:
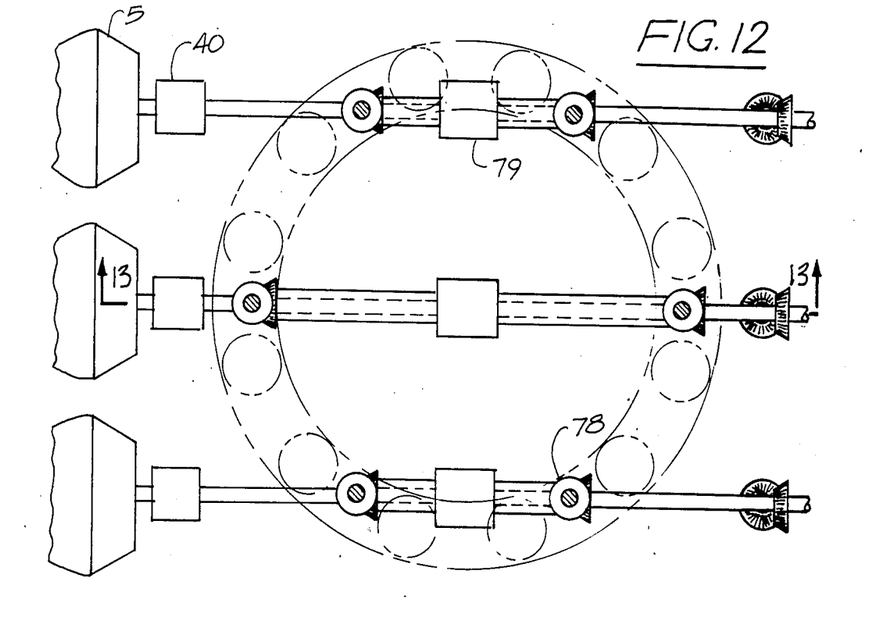
FIGS. 12 and 13 show an alternate means of driving the 18 final stage pinions of the inventive transmission with only three horizontal engines instead of the six vertical engines shown in FIG. 6 by adding another gear stage to the transmission.
Figure 13:
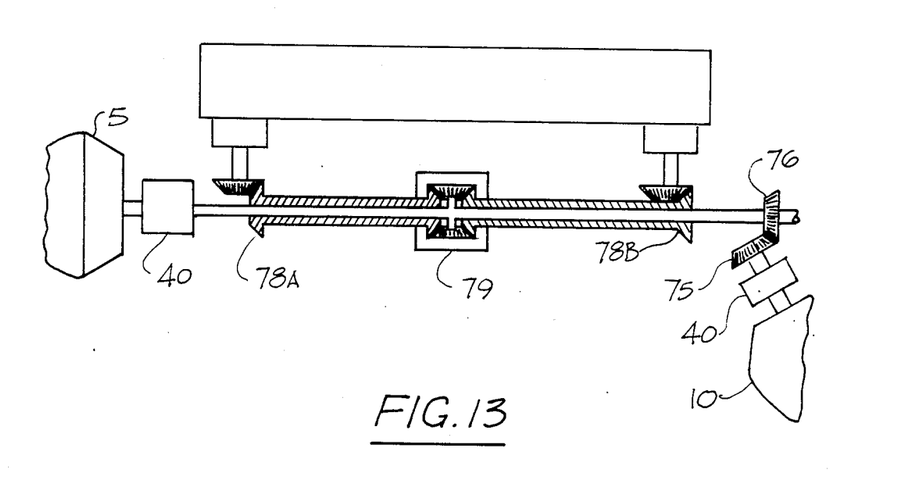

FIGS. 12 and 13 show an alternate method of powering the transmission. By mounting three engines horizontally each driving first through differential 79 and then through two output bevel gear meshes 78A and 78B, six final stage pinions can be driven from each engine, (two pinions 33, two pinions 34A, and two pinions 34B). This has the advantage of using fewer (but more powerful) engines at the expense of another gear mesh in series which, however, will reduce the overall efficiency and add to the weight of the transmission.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An ultra lightweight mechanical shaft-horsepower type power transmission for use in supporting and driving heavy lift helicopters comprising:
   a rotatable power output ring gear;
   bearingless mounting means solely supporting said rotatable power output ring gear at the pitch diameter of its teeth;
   propulsion means parallel and radially disposed with the rotatable axis of said ring gear and operably coupled in load bearing and driving relationship to said rotatable power output ring gear via said mounting means; and
   said mounting means providing multiple power inputs to said rotatable power output ring gear in order to provide multiple torque load paths thereto.

2. The invention as defined in claim 1 wherein:
   said mounting means includes a plurality of sets of pinion gears constituting a "floating" mount for imparting a driving load to said ring gear and for movably supporting said ring gear.

3. The invention as defined in claim 2 herein:
   a plurality of separate gear drive trains directly driven by said propulsion means;
   each of said sets of pinion gears comprising three intermeshed pinion gears in which the power from each of said sets of three pinion gears is obtained from said separate gear drive trains whereby the driving power path is combined at said sets of pinions in mesh with said power output ring gear for driving said power output ring gear.

4. The invention as defined in claim 3 including:
   each set of said three pinion gears having an intermediate pinion floating between two outer pinions;
   said intermediate pinion characterized as equally dividing its power to said outer pinions whereby the load applied to one of said outer pinions is equal and opposite to the other pinion in a pure force couple in the absence of sheer forces.

5. The invention as defined in claim 4 wherein:
   each set of pinion gears is driven via separate power source.

6. The invention as defined in claim 4 wherein:
   said rotating power output ring carries teeth of a herringbone configuration meshed with conformed herring bone configured teeth of said pinion gears in each of said sets; and
   said rotating power output ring gear and multiple pinion gear set characterized as having a high gear ratio.

7. The invention as defined in claim 6 including:
   means by which each of said herringbone type pinion gears can rotate in three degrees of rotational freedom, pitch, roll, and yaw, about its center point of symmetry in order that it can "track" the random angular deflections and imperfections of the mating teeth of the ring gear with the least amount of resistance, and
   means by which all but three or more of these pinions can translate axially in order that they may "track" random axial deflections and imperfections of the mating teeth of the ring gear with the least amount of resistance, and
   means of restraining any load and lag tendencies of said "tracking" movement.

8. The invention as defined in claim 7 including:
   means by which the three or more pinions not having axial freedom may be supported in order that they in turn shall axially support the ring gear.

9. The invention as defined in claim 8 wherein:
   said three degrees of rotational freedom of the pinions are obtained by supporting said pinion by a single spherical bearing mounted at the symmetrical centerpoint of each pinion, and
   the driving torque is supplied by a co-axial quill shaft transmitting its torque to the pinion assembly through a crowned spline whose misalignment center coincides with the three dimensional center of rotation of the pinion.

10. The invention as defined in claim 9 having:
    means of assembling and installing a multiplicity of pinions, each having three rotational degrees of freedom with torque transmission capabilities to a common bull gear by torsionally attaching two helical gears (of opposite helix angle thereby forming a herringbone assembly) to a common shaft which accepts torque from a quill shaft at its internal diameter and a spherical bearing between the two helical gears on the outside diameter of the common shaft.

11. The invention as defined in claim 10 including a transmission housing:
    means for supporting the spherical bearing and reacting the torsional load induced by the pinions by mounting the outside non-rotating member of the spherical bearing to a flat segmented sheer web surrounding the ring gear axis with its outside diameter attached to the transmission housing.

12. The invention as defined in claim 11 including:
    a chosen number of spherical pinion bearings mounted to the sheer web with a slip fit allowing them to float axially thereby relieving axial loads derived from deflections and tolerances while others are secured axially to take the thrust loads of the ring gear.

13. The invention as defined in claim 1 wherein:
said mounting means includes a plurality of sets of pinion gears constituting a floating mount; and
planetary gear means operably interconnecting said propulsion means to each of said sets of pinion gears.

14. The invention as defined in claim 13 wherein:
said propulsion means includes a plurality of engines connected in driving relationship to each of said sets of pinion gears respectively via said respective planetary gear means.

15. The invention as defined in claim 14 wherein:
said power output ring gear carries gear teeth of a herringbone configuration meshed with conformal herringbone configured teeth of said pinion gears in each of said sets; and
said power output ring gear characterized as having a high gear ratio.

16. The invention as defined in claim 15 including:
means mounting said pinion gears of each set to maintain pitch diameter tangency having means movably supporting said pinion gears which includes a spherical pinion support bearing forcibly urging said conformal herringbone teeth of said power output ring gear and each of said pinion gears into a preloaded condition.

17. The invention as defined in claim 16 wherein:
said pinion gears of each of said sets include centers of rotation lying on a flat, linear plane relationship.

18. The invetion as defined in claim 17 wherein:
said flat, linear plane relationship is defined by each set of pinion gears comprising a pair of outer lay pinion gears of a given diameter separated by a center pinion gear of lesser diameter than said given diameter.

19. An ultra lightweight mechanical gear type power transmission for use in applications where low weight, high gear reduction, high power, and high efficiency is required in propulsion applications such as heavy lift helicopters, ocean-going vessels, submarines, etc., said transmission comprising:
a bearingless rotatable power output ring gear;
a ring gear mounting means for both driving and supporting said ring gear comprising:
a multiplicity of driving pinion gears characterized as having freedom of motion in all six degrees of motion including three degrees of rotational and three degrees of translational motion;
constraining means interconnecting said pinion gears to maintain mating tooth pitch diameter tangencies while being allowed to freely follow any discrepancies and imperfections present in said ring gear.

20. The invention as defined in claim 19 including:
a multiple power path propulsion means operably coupled to said rotatable power output ring gear via said mounting means to reduce torque of a plurality of intermediate components by providing multiple load paths between a power input and said ring gear.

21. The invention as defined in claim 20 wherein:
said multiplicity of driving pinion gears at a final stage are in groups of three pinions per group whereby each of said groups of three pinions is driven by a single input shaft mounted parallel to said pinion gears and said ring gear with parallel intermediate gearing to transfer power from said single input shaft of three final stage pinion gears.

22. The invention as defined in claim 21 wherein:
the power from each of said parallel input shafts is split into three separate power paths, first into two power paths of reduced RPM through a differential planetary gear mesh wherein a planetary ring gear is the power input, the planet carrier (driven in the same direction of rotation) is one of the two output power paths and said planetary ring gear (driven in the opposite direction) is the other;
said power paths being split into two power paths by an intermediate pinion gear driving two gears on separate parallel lay shaft power paths, the result of which is three separate power shafts rotating in the same direction coming from each parallel input shaft through its differential planetary reduction gear mesh.

23. The invention as defined in claim 22 wherein:
each of said three power shafts being driven by said group's parallel input shaft drive by a final stage pinion;
outside pinions of each group of three pinions having pitch diameters equal to each other but are larger than the center final stage pinion pitch diameter so that all three final stage pinions mesh with said ring gear while their rotational axes fall on the same plane which allows said intermediate pinion to float symmetrically (without being supported by a bearing) on either side of the plane between the lay shaft gears constituting load sharing in a closed loop-split path gear train.

24. The invention as defined in claim 23 wherein:
said floating intermediate pinion is torsionally connected to its differential planetary output member through a floating quill shaft having spherical splines at each end of the shaft to allow it to carry torque while it floats with a minimum of restraint on either side of the plane upon which the three axes of rotation fall.

25. The invention as defined in claim 24 wherein:
a spherical spline on one end of the said quill shaft having one more tooth than the spline on the other end of said shaft in order to provide a micro adjustment to the neutral position of the intermediate pinion.

26. The invention as defined in claim 20 wherein:
each input power shaft driving its group of three final stage pinions can either be driven by a separate power source or can be interconnected to one or more other output shafts by bevel gears to provide fewer power sources.

27. The invention as defined in claim 20 wherein:
said final stage ring gear/multiple pinion gear mesh is of a herringbone type for quiet operation and to force the passive pinions to follow the axial motion of the ring gear and to force the ring gear to follow the axial motion of the three support pinions.

* * * * *